(12) United States Patent
Haecker et al.

(10) Patent No.: US 8,870,463 B2
(45) Date of Patent: Oct. 28, 2014

(54) ECCENTRIC BEARING

(75) Inventors: Juergen Haecker, Schwieberdingen (DE); Norbert Alaze, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/695,471

(22) PCT Filed: Mar. 10, 2011

(86) PCT No.: PCT/EP2011/053599
§ 371 (c)(1),
(2), (4) Date: Mar. 14, 2013

(87) PCT Pub. No.: WO2011/138076
PCT Pub. Date: Nov. 10, 2011

(65) Prior Publication Data
US 2013/0205940 A1 Aug. 15, 2013

(30) Foreign Application Priority Data
May 5, 2010 (DE) .......................... 10 2010 028 598

(51) Int. Cl.
*F16C 19/50* (2006.01)
*F16C 23/10* (2006.01)
*F16H 25/14* (2006.01)
*F04B 9/04* (2006.01)

(52) U.S. Cl.
CPC ................ *F16H 25/14* (2013.01); *F16C 19/50* (2013.01); *F04B 9/045* (2013.01)
USPC .......................................... 384/447; 384/604

(58) Field of Classification Search
USPC ......... 384/416, 428, 432, 445, 447, 548, 593, 384/604
See application file for complete search history.

(56) References Cited

U.S. PATENT DOCUMENTS

| 1,947,703 | A | * | 2/1934 | Fishburn | 192/45.003 |
| 2,029,244 | A | * | 1/1936 | Linder | 192/45.003 |
| 2,931,249 | A | * | 4/1960 | Walton | 74/640 |
| 4,776,708 | A | * | 10/1988 | Carlson | 384/447 |
| 6,644,138 | B2 | * | 11/2003 | Dorrie | 384/491 |

FOREIGN PATENT DOCUMENTS

| EP | 1788244 A2 | * | 5/2007 | ............... F04B 1/04 |
| FR | 2 637 660 A1 | | 4/1990 | |
| JP | 51-71443 A | | 6/1976 | |
| JP | 61-215480 A | | 9/1986 | |
| JP | 2-168016 A | | 6/1990 | |

OTHER PUBLICATIONS

International Search Report corresponding to PCT Application No. PCT/EP2011/053599, mailed Jun. 1, 2011 (German and English language document) (5 pages).

* cited by examiner

*Primary Examiner* — Marcus Charles
(74) *Attorney, Agent, or Firm* — Maginot, Moore & Beck

(57) ABSTRACT

An eccentric bearing for an electrohydraulic piston pump assembly of a vehicle brake system includes a shaft which can be driven in rotation about its axis, a bearing ring which is eccentric relative to the shaft, and rolling bodies arranged between the bearing ring and the shaft. The rolling bodies have different diameters corresponding to a varying width of a gap between the bearing ring and the shaft. When the shaft is driven in rotation, an eccentricity of the bearing ring circulates around the shaft at half of the rotational speed of the shaft and drives pump pistons. The pump pistons bear at the outside against the bearing ring so as to perform a reciprocating movement.

8 Claims, 1 Drawing Sheet

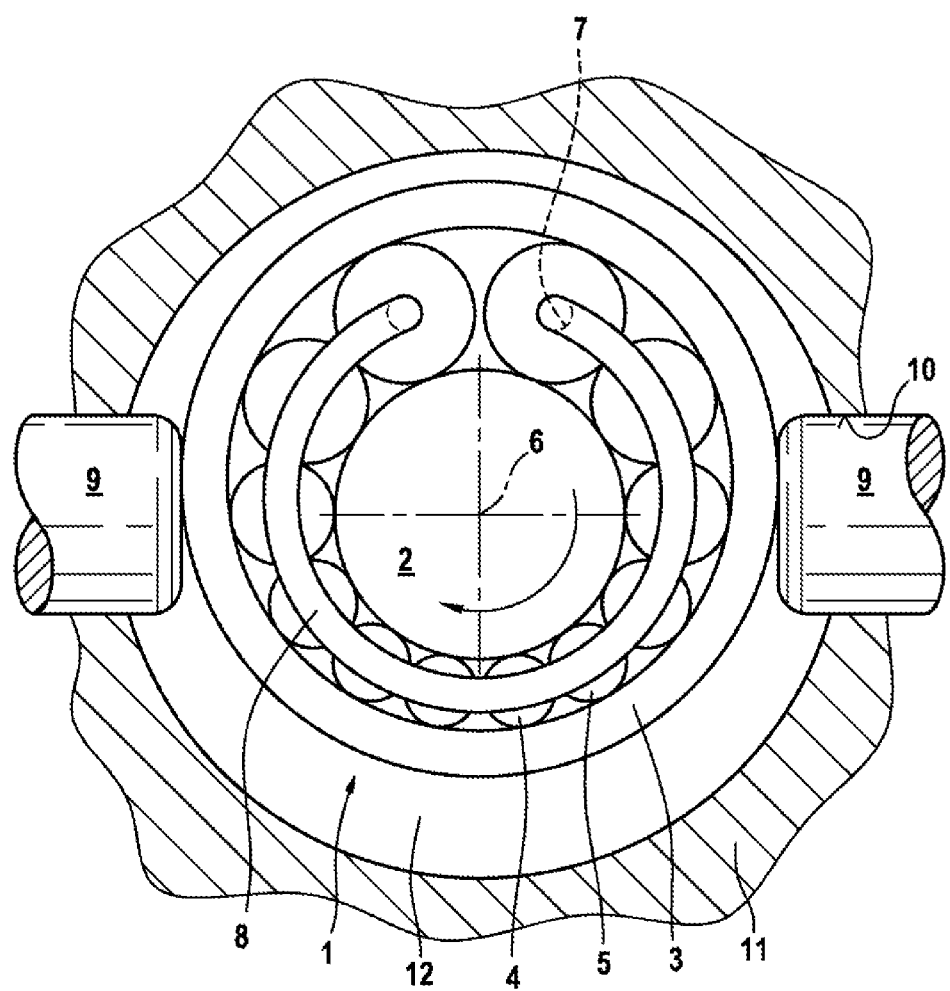

ECCENTRIC BEARING

CROSS REFERENCE OF RELATED APPLICATIONS

This application is a 35 U.S.C. §371 National Stage Application of PCT/EP2011/053599, filed on Mar. 10, 2011, which claims the benefit of priority to Serial No. DE 10 2010 028 598.6, filed on May 5, 2010 in Germany, the disclosures of which are incorporated herein by reference in their entirety.

BACKGROUND

The disclosure relates to an eccentric bearing having the features described below. The eccentric bearing according to the disclosure is intended, in particular, for an electrohydraulic piston pump assembly of a hydraulic brake system of a motor vehicle. Such pump assemblies are used for generating a hydraulic brake pressure for brake actuation in traction-controlled and/or power-assisted brake systems.

Known eccentric bearings have an eccentric shaft which is attached in one piece or in another way rigidly and eccentrically to a motor shaft of an electric motor or to an output shaft of a gear which can be driven by means of the electric motor. The eccentric shaft has arranged on it a rolling bearing with a bearing ring concentrically surrounding the eccentric shaft and with rolling bodies which are arranged in a gap between the eccentric shaft and the bearing ring around the shaft, usually, but not necessarily, equidistantly. The rolling bodies are normally rollers or needles, although they may also be other rolling bodies, for example balls. The bearing ring may be interpreted as an outer ring, and an inner ring may be present, for example pressed onto the eccentric shaft. However, an inner ring is not necessary, and the rolling bodies may also roll directly on the eccentric shaft. One or more pump pistons of the pump piston assembly bear with their end faces on the bearing ring on the outside. The pump pistons are pressed, for example by means of springs, into bearing contact against the bearing ring from outside.

During rotary drive, the eccentric shaft, because of its eccentricity, executes movement on a circular path and at the same time rotates about itself. On account of the movement of the eccentric shaft on the circular path, the bearing ring also moves on a or on the same circular path and thereby drives the pump piston, bearing against it on the outside, in the desired lifting movement, in order to convey brake fluid or fluid in general by alternate suction intake and displacement, as is known from piston pumps. On account of its rolling mounting, the bearing ring does not corotate with the eccentric shaft.

In electrohydraulic piston pump assemblies for hydraulic brake systems of motor vehicles, the eccentric bearings convert a rotational movement of an electric motor or of an output shaft of a gear into a lifting movement for driving the pump pistons.

SUMMARY

The eccentric bearing according to the disclosure has a rotationally driveable shaft, on which is seated a rolling bearing with a bearing ring surrounding the shaft and with rolling bodies arranged in a gap between the shaft and the bearing ring around the shaft, and in this case the rolling bodies may be, but do not have to be, arranged equidistantly. In contrast to known eccentric bearings, the shaft of the eccentric bearing according to the disclosure is provided concentrically to its axis of rotation, even though it is conceivable, and not ruled out by the disclosure, that the shaft is eccentric to its axis of rotation. Instead of or, where appropriate, in addition to an eccentricity of the shaft, the bearing ring is eccentric to the shaft, and the rolling bodies have different diameters according to a different gap width between the shaft and the bearing ring on account of the eccentricity of the bearing ring with respect to the shaft. The rolling bodies have diameters which are as large as the width of the gap between the bearing ring and the shaft at the circumferential point where the respective rolling body is located.

During rotary drive of the shaft, the rolling bodies roll on the shaft and in the bearing ring and run around the shaft, as is known from rolling bearings. In this case, the rolling bodies having a large diameter press the bearing ring away from the shaft, and, on the opposite side where the rolling bodies having a smaller diameter are located, the bearing ring approaches the shaft. The changing gap width, as it were, revolves together with the rolling bodies around the rotationally driven shaft, that is to say the widest, the narrowest and any other gap width revolve with the rolling bodies around the shaft. The bearing ring moves on a circular path around the shaft with an eccentricity with respect to the shaft. A rotational movement of the shaft is converted into a lifting movement of one or more pump pistons bearing against the bearing ring on the outside. On the assumption of a bearing ring not corotating with the shaft, the rolling bodies revolve at half the rotational speed of the shaft, and the speed at which the bearing ring moves on the circular path is likewise halved. The eccentric bearing according to the disclosure has speed reduction, and, with the bearing ring being fixed in terms of rotation, a speed of revolution of the eccentricity of the bearing ring is halved in relation to the rotational speed of the shaft. The speed reduction has the advantage that a drive with a higher rotational speed is possible, which, with the power output being the same, enables a smaller and lighter electric motor to be used.

A further advantage of the eccentric bearing according to the disclosure is its simple and cost-effective set-up.

The eccentric bearing according to the disclosure is intended, in particular, for the explained use in an electrohydraulic piston pump assembly for generating a brake pressure in a hydraulic brake system of a motor vehicle, where it converts the rotational movement of an electric motor into a lifting movement for driving pump pistons. However, the disclosure is not restricted to this use, but is also aimed at the eccentric bearing as such.

Advantageous refinements and developments of the disclosure are the subject matter of the below description.

BRIEF DESCRIPTION OF THE DRAWING

The disclosure is explained in more detail below by means of an exemplary embodiment illustrated in the drawing. The single FIGURE shows an eccentric bearing according to the disclosure in an end view.

DETAILED DESCRIPTION

The eccentric bearing 1 according to the disclosure, illustrated in the drawing, has a shaft 2 which is surrounded by a bearing ring 3. Rollers 5 as rolling bodies are arranged around the shaft 2 in a gap 4 between the bearing ring 3 and the shaft 2. The bearing ring 3 and the rollers 5 may, where appropriate, be interpreted, together with the shaft 2, as a rolling bearing. The shaft 2 can be driven in rotation about its axis 6, which at the same time is its axis of rotation, by means of an electric motor which cannot be seen in the drawing because it is located behind the drawing plane. The shaft 2 has no eccentricity. It may, for example, be the end of a motor shaft of the electric motor.

The bearing ring 3 is eccentric to the shaft 2, and a width of the gap 4 between the bearing ring 3 and the shaft 2 changes in the circumferential direction. Starting from a maximum gap width, which is at the top in the drawing, the gap width decreases in both circumferential directions to a minimum gap width which is located opposite the maximum gap width, that is to say at the bottom in the drawing.

The rollers 5 which form the rolling bodies have different diameters according to the different gap width. The diameters of the rollers 5 are in each case as large as the gap 4 between the bearing ring 3 and the shaft 2 at the point where the respective roller 5 is located.

During the rotary drive of the shaft 2, the rollers 5 roll on a circumference of the shaft 2 and at the same time revolve at half the rotational speed of the shaft 2. The maximum gap width of the gap 4 between the bearing ring 3 and the shaft 2 revolves together with the two rollers 5 having the largest diameters. The minimum gap width of the gap 4 between the bearing ring 3 and the shaft 2 likewise revolves around the shaft 2 with the two rollers 5 having the smallest diameters, at half the rotational speed of the shaft 2. In other words, during the rotary drive of the shaft 2, an eccentricity of the bearing ring 3 with respect to the shaft 2 revolves around the shaft 2, the speed of revolution of the eccentricity being half the rotational speed of the shaft 2 if the bearing ring 3 does not corotate. The bearing ring 3 moves on a circular path around the axis 6 of the shaft 2, which at the same time is the axis of rotation of the latter, a speed of the circular movement of the bearing ring 3 being half the rotational speed of the shaft 2, that is to say speed reduction takes place.

The two rollers 5 having the largest diameters and the two rollers 5 having the smallest diameters are spaced apart from one another in the circumferential direction. The rollers 5 between the largest and the smallest rollers 5 bear one against the other and against the largest and the smallest roller 5, but are not connected to one another. The eccentric bearing 1 has no roller cage or the like. Only the two rollers 5 having the largest diameters are connected: they have axial holes 7, by means of which they are mounted rotatably on angled ends of a spring clip 8. The spring clip 8 is a circular wire clip 8 which is open at one point and which surrounds the shaft 2 approximately in a middle of the gap 4 between the bearing ring 3 and the shaft 2. The spring clip 8 is located laterally next to the rollers 5 and therefore, where appropriate, also laterally next to the bearing ring 3 and/or the shaft 2. As already stated, the ends of the spring clip 8 are angled at right angles, and they run axially parallel to the shaft 2.

The spring clip 8 acts upon the two rollers 5 having the largest diameters with a prestress so as to move them apart in an elastically resilient manner, that is to say into the narrowing gap 4 between the bearing ring 3 and the shaft 2. As a result of the spring action, the rollers 5 having the largest diameters act upon the following rollers 5, bearing against them, likewise in the direction of the narrowing gap 4 between the bearing ring 3 and the shaft 2, so that each roller 5 is acted upon in the direction of the narrowing gap 4. The resilient action upon the two rollers 5 having the largest diameters gives rise to freedom of play for the bearing ring 3 on the shaft 2. With the exception of the two rollers 5 having the largest diameters, which are pressed elastically apart from one another, no further rollers 5 are connected to one another, but instead merely bear one against the other.

Pump pistons 9 bear with their end faces against the bearing ring 3 on the outside of the latter. The pump pistons 9, only end faces of which are illustrated in the drawing, are arranged radially with respect to the shaft 2 and are pressed against the bearing ring 3 from outside by piston springs, not illustrated. The pump pistons 9 are received in pump bores 10 of a pump housing 11 axially displaceably, that is to say displaceably radially with respect to the shaft 2. The eccentric bearing 1 is located in a cylindrical eccentric space 12 of the pump housing 11 between the two pump pistons 9 which, in the exemplary embodiment, are arranged opposite one another, that is to say in an opposed arrangement. By the shaft 2 being driven in rotation, the bearing ring 3 moves, without corotating with the shaft 2, at half the speed of the rotational speed of the shaft 2 on a circular path around the axis 6 and axis of rotation of the shaft 2. The circular movement of the bearing ring 3 drives the pump pistons 9 in a lifting movement. The eccentric bearing 1 thus converts the rotational movement of the shaft 2 into a lifting movement for driving the pump pistons 9. The pump housing 11 is an integral part of what is known as a hydraulic block in which, in addition to the pump pistons 9, further hydraulic structural elements, not illustrated, such as solenoid valves of a traction control device for a hydraulic brake system of a motor vehicle, are arranged and connected hydraulically to one another. Such hydraulic blocks are known per se and will not be explained in any more detail here.

The invention claimed is:

1. An eccentric bearing for converting a rotational movement into a lifting movement comprising:
   a rotationally drivable shaft;
   a bearing ring eccentrically surrounding the shaft; and
   a plurality of rolling bodies arranged in a gap between the shaft and the bearing ring, wherein:
   the gap has a variable width;
   each of the rolling bodies has one of a variety of diameters according to the variable width of the gap, wherein each of the plurality of rolling bodies bears directly against at least one of an adjacent rolling body; and
   the plurality of rolling bodies includes:
      two largest rolling bodies having largest diameters; and
      a spacing in a circumferential direction between the two largest rolling bodies.

2. The eccentric bearing as claimed in claim 1, wherein rolling bodies positioned adjacently to one another are not connected to one another.

3. The eccentric bearing as claimed in claim 1, wherein the plurality of rolling bodies further includes two rolling bodies connected to one another in the circumferential direction of the eccentric bearing.

4. The eccentric bearing as claimed in claim 3, wherein the two largest rolling bodies are connected to one another in the circumferential direction of the eccentric bearing.

5. The eccentric bearing as claimed in claim 3, wherein the connected rolling bodies are pressed apart from one another elastically in the circumferential direction of the eccentric bearing.

6. The eccentric bearing as claimed in claim 1, further comprising a clip connected to the two largest rolling bodies, wherein the clip is configured to move the two largest rolling bodies apart in an elastically resilient manner.

7. The eccentric bearing as claimed in claim 6, wherein the clip links the two largest rolling bodies in the circumferential direction of the eccentric bearing.

8. The eccentric bearing as claimed in claim 7, wherein the plurality of rolling bodies other than the two largest rolling bodies are not connected to one another but instead bear against one of the adjacent rolling bodies.

* * * * *